US012376199B2

(12) United States Patent
Jacobs et al.

(10) Patent No.: US 12,376,199 B2
(45) Date of Patent: Jul. 29, 2025

(54) 3D PRINTED SUSCEPTOR FOR RAPID INDIRECT RF HEATING

(71) Applicant: The Government of the United States of America, as represented by the Secretary of the Navy, Arlington, VA (US)

(72) Inventors: Alan G. Jacobs, Rockville, MD (US); Boris N. Feigelson, Springfield, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 424 days.

(21) Appl. No.: 17/347,646

(22) Filed: Jun. 15, 2021

(65) Prior Publication Data

US 2021/0400777 A1    Dec. 23, 2021

Related U.S. Application Data

(60) Provisional application No. 62/705,246, filed on Jun. 18, 2020.

(51) Int. Cl.
*H05B 6/10* (2006.01)
*B22F 5/10* (2006.01)
(Continued)

(52) U.S. Cl.
CPC .............. *H05B 6/105* (2013.01); *B33Y 70/00* (2014.12); *B33Y 80/00* (2014.12); *B22F 5/10* (2013.01); *B22F 2301/20* (2013.01)

(58) Field of Classification Search
CPC . B33Y 70/00; B33Y 80/00; B22F 5/10; B22F 2301/20; H05B 6/105
See application file for complete search history.

(56) References Cited

U.S. PATENT DOCUMENTS

| 9,543,168 B2 | 1/2017 | Feigelson et al. |
| 2005/0178334 A1* | 8/2005 | Shinma ............... C23C 16/4581 118/725 |

(Continued)

OTHER PUBLICATIONS

Search Report and Written Opinion mailed Nov. 12, 2021 in corresponding International Application No. PCT/US2021/037304.
(Continued)

*Primary Examiner* — John J Norton
*Assistant Examiner* — Dilnessa B Belay
(74) *Attorney, Agent, or Firm* — US Naval Research Laboratory; Jorie L. Stroup

(57) ABSTRACT

RF susceptors manufactured by means of 3D printing. 3D-printed susceptors in accordance with the invention include susceptors having solid or mesh walls, where the susceptors are in the form of hollow cylinders, pyramids, spheres, hemispheres, ellipsoids, paraboloids, toroids, or prisms; flat planes; or other hollow or solid three-dimensional shapes. The 3D-printed susceptors can be formed from any suitable starting material, such as tungsten powder, graphite, silicon carbide, molybdenum powder, tantalum powder, rhenium powder, or alloys thereof, or can be formed such that some portions of the susceptors are formed from one or more materials while other portions are formed from different material(s).

18 Claims, 5 Drawing Sheets

(51) Int. Cl.
B33Y 70/00 (2020.01)
B33Y 80/00 (2015.01)

(56) References Cited

U.S. PATENT DOCUMENTS

| | | | |
|---|---|---|---|
| 2013/0040082 A1 | 2/2013 | Mascia et al. | |
| 2015/0245669 A1* | 9/2015 | Cadieux | A24F 40/42 |
| | | | 131/329 |
| 2017/0334024 A1* | 11/2017 | Buller | B23K 26/144 |
| 2017/0347715 A1* | 12/2017 | Mironov | A24F 40/42 |
| 2018/0063895 A1* | 3/2018 | Van Tooren | B29C 66/1122 |
| 2018/0361510 A1* | 12/2018 | Stamp | B29C 64/10 |
| 2019/0208827 A1* | 7/2019 | Mironov | A24F 40/42 |
| 2021/0204604 A1* | 7/2021 | Mironov | H05B 6/108 |

OTHER PUBLICATIONS

White paper by Dunlee entitled "Dunlee's Co-Development of 3D-Printed Tungsten Parts Helps Customers Succeed".

\* cited by examiner

~0.75s within 25% of pulse peak

3D PRINTED SUSCEPTOR FOR RAPID INDIRECT RF HEATING

CROSS-REFERENCE

This Application is a Nonprovisional of and claims the benefit of priority under 35 U.S.C. § 119 based on U.S. Provisional Patent Application No. 62/705,246 filed on Jun. 18, 2020. The Provisional Application and all references cited herein are hereby incorporated by reference into the present disclosure in their entirety.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing Navy Case #113243.

TECHNICAL FIELD

The present disclosure relates to radio frequency (RF) susceptors, in particular RF susceptors made by means of additive manufacturing, which permits the formation of susceptors having geometrical forms not possible to make by means of traditional machining methods.

BACKGROUND

Radio Frequency (RF) heating is an important industrial tool for non-contact heating of a multitude of materials for annealing. This is applied directly to parts of interest in the case of magnetic or conductive materials, or indirectly via use of susceptors, for materials which cannot directly absorb the RF energy.

More rapid indirect heating and cooling of materials via RF heating opens up new annealing moieties and bridges the gap between RF and other transient heating techniques such as laser or flash lamp annealing. Furthermore, it provides a non-contact heating method insensitive to important sample properties such as conductivity or optical properties unlike laser or flash lamp annealing providing facile routes to dopant activation in ultra-wide bandgap materials and other applications.

A susceptor can be any absorbing material susceptible to RF radiation, including magnetic and conductive materials. In a typical indirect RF heating moiety, the susceptor is directly heated by nearby RF coils causing the susceptor to glow which transfers heat via the infrared and visible light to the material of interest. The non-contact nature of RF heating allows extremely high temperatures to be achieved so refractory materials, such as graphite, steel, molybdenum, or tungsten are typically used to make susceptors.

In transient heating applications such as the Symmetric Multicycle Rapid Thermal Annealing (SMRTA) technique for annealing GaN described in U.S. Pat. No. 9,543,168 to Feigelson et al., RF power is increased for higher temperatures or decreased to cool the susceptor to affect the materials of interest. In order to improve control and speed of the transient heating pulses and subsequent rapid cooling, the susceptor must rapidly respond to the applied RF power level. Since more rapid heating can be achieved by simply applying more power, the rate of cooling often determines the minimum transient heating pulse duration. Three major factors determine the cooling rate of the susceptor: (1) the thermal mass of the susceptor, (2) the thermal transport of heat from the interior of the susceptor material to the surfaces, and (3) the rate of heat loss from the susceptor to the environment by radiation, convection, and conduction. Thus, from the perspective of cooling, the ideal susceptor has no thermal mass, high thermal conductivity, and exhibits rapid heat loss.

To reduce the susceptor thermal mass, minimal material must be utilized to form the susceptor. However, for a given RF generator frequency, the material requires some minimum thickness to absorb the RF power, limiting the usable thickness range. The characteristic thickness of a given susceptor material is primarily determined by the its electrical conductivity, with a more conductive material absorbing the RF power in a shorter, thinner distance. Similarly, as the RF frequency increases, the absorption depth also decreases. Thus, a thinner susceptor is possible for highly conductive (i.e. metallic) materials at high frequency. Unfortunately, such refractory metals are brittle and thus difficult to machine to the thicknesses (<1 mm) in long cylinders or irregular shapes that may be of interest for RF susceptors.

Thermal transport of heat from the interior of the susceptor to its surfaces is determined by (i) the susceptor thermal conductivity (reduced at high temperature due to phonon scattering), and (ii) the distance to a heat sink (i.e. surfaces to environmental loss). Thermal transport in a susceptor is also greatly increased with smaller susceptor dimensions.

Finally, heat loss to the environment at high temperatures is typically dominated by radiative losses, with a significant contribution from convective losses, especially at elevated operating pressures such as are used in the SMRTA annealing described in the '168 patent, supra. Such radiative losses are difficult to modulate because they are primarily determined by the emissivity of the susceptor material, which ranges from 0 to 1, typically ~0.3 for most materials at high temperature, and are further determined by susceptor area, as determined by the susceptor geometry. Convective losses to the environment can be modulated by increasing the ambient pressure, by tailoring the composition of the susceptor, or by tailoring the surface area-to-volume ratio of the susceptor; however, this is often precluded by the requirements of the annealing ambient, limitations on producing the susceptor, or simply cost.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides RF susceptors manufactured by means of 3D printing, where the susceptors have geometries that are not obtainable through the use of conventional manufacturing techniques.

In some embodiments, susceptors in accordance with the present invention include susceptors having solid or mesh walls, where the susceptors can be in the form of hollow structures such as cylinders, pyramids, spheres, hemispheres, ellipsoids, paraboloids, toroids, or prisms; flat planes; or any other solid or hollow three-dimensional shape. In many embodiments, the susceptors will have a wall thickness of less than 1 mm, often of as little as 1 μm or less, but susceptors having other suitable thicknesses may be possible, where the geometry of the susceptor is configured to the rapid heating and cooling times needed for the particular application in which the susceptors is used.

The 3D-printed susceptors in accordance with the present invention can be formed from any suitable starting material, such as tungsten powder, graphite, silicon carbide, molybdenum powder, tantalum powder, rhenium powder, or alloys thereof, or can be formed such that some portions of the susceptors are formed from one or more materials while other portions are formed from different material(s).

DETAILED DESCRIPTION

Figures 1A, 1B, 1C, 1D:
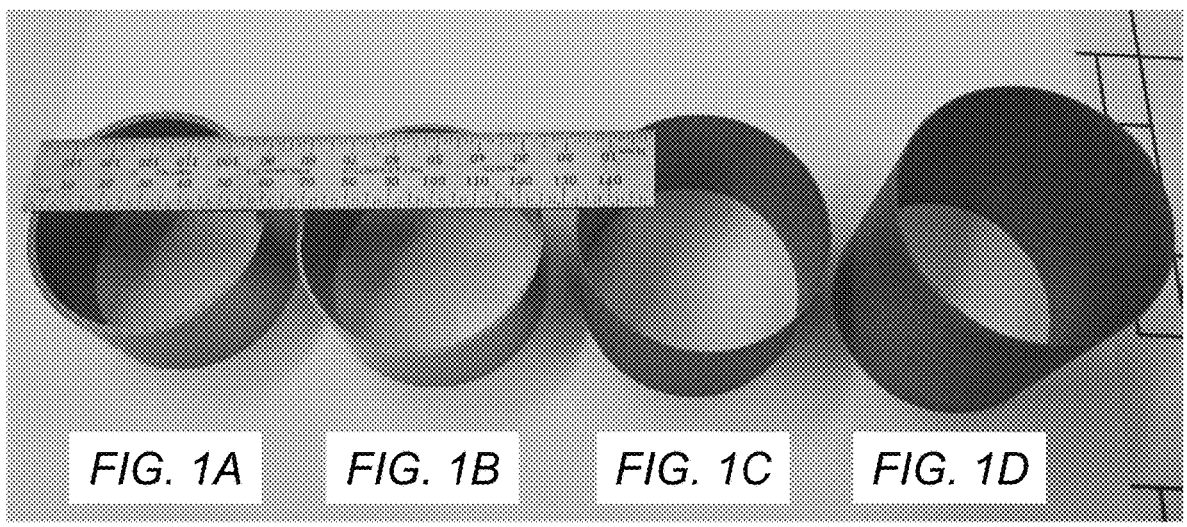
FIGS. 1A-1D depict exemplary thin solid cylindrical tungsten susceptors in accordance with the prior art, which are fabricated via conventional machining (FIGS. 1A-1B) and tungsten susceptors in accordance with the present invention, which are fabricated via additive manufacturing (FIGS. 1C-1D).

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

The present invention provides RF susceptors manufactured by means of 3D printing, where the susceptors have geometries that are not obtainable through the use of conventional manufacturing techniques.

In some embodiments, susceptors in accordance with the present invention include susceptors having solid or mesh walls, where the susceptors can be in the form of hollow structures such as cylinders, pyramids, spheres, hemispheres, ellipsoids, paraboloids, toroids, or prisms; flat planes; or any other solid or hollow three-dimensional shape. In many embodiments, the susceptors will have a wall thickness of less than 1 mm, often of as little as 1 μm or less, but susceptors having other suitable thicknesses may be possible, where the geometry of the susceptor is configured to the rapid heating and cooling times needed for the particular application in which the susceptors is used.

The 3D-printed susceptors in accordance with the present invention can be formed from any suitable starting material, such as tungsten powder, graphite, silicon carbide, molybdenum powder, tantalum powder, rhenium powder, or alloys thereof, or can be formed such that some portions of the susceptors are formed from one or more materials while other portions are formed from different material(s).

During traditional manufacturing of susceptors, the part starts as solid material and has excess material removed to obtain the final geometry. In addition to significant waste material, the final part must be able to withstand the large stresses required to cut away the excess material. In contrast, additive manufacturing typically starts as a powder that is formed into the final part or near final part dimensions via in-situ selective sintering via localized heating such as with a laser or electron beam. Due to the brittle nature of refractory materials, they have poor machinability requiring special techniques to machine and limited resultant geometries.

Additive manufacturing provides several distinct advantages over traditional manufacturing for RF susceptors: (1) reduction in susceptor thickness can be readily achieved; (2) pure material or other alloys not readily machinable can be used; (3) porosity and surface roughness can be readily controlled or introduced; and (4) susceptor geometry constraints are significantly relaxed, allowing the formation of susceptors having novel structures or extremely large surface area to volume ratios.

Reduction in the minimum susceptor wall thickness provides significant improvement of heating rates by itself. For example, while pure tungsten can be machined to produce parts having a wall thickness of approximately 1 mm, additive manufacturing can produce tungsten parts having wall thicknesses between 1 mm and 1 μm or even less, providing a 4× reduction in thermal mass and 16× reduction in thermal diffusion time to the surface.

In addition, a susceptor formed by means of additive manufacturing has a much more readily controllable height and/or length than can be achieved using conventional machining of solid material. This is illustrated by the photographic images shown in FIGS. 1A-1D. FIGS. 1A and 1B depict conventional tungsten susceptors formed by machining (i.e., lathing) a solid piece of tungsten into a hollow cylinder. The susceptor shown in FIG. 1A is 2 mm thick and 30 mm tall, with a 57 mm outer diameter. The susceptor shown in FIG. 1B has the same height and diameter, but with thinner walls having a thickness of 1 mm. This 1 mm thickness is close to the minimum thickness that can be achieved for conventionally machined tungsten susceptors having a height of approximately 40 mm. Parts machined at this height or higher while maintaining a cylinder thickness of 1 mm result in significant scrap and excessive cost from failed fabrication attempts. While it may be possible to machine parts that are thinner or larger, the costs for doing so greatly increase, making large-scale manufacturing of such parts untenable.

In contrast, 3D printing allows the manufacture of susceptors having any arbitrary height and/or length. For example, FIGS. 1C and 1D show 3D-printed susceptors in accordance with the present invention. As can be seen from the images in FIGS. 1C-1D, the susceptors fabricated via additive manufacturing are significantly thinner at 0.5 mm than the susceptors fabricated via conventional machining shown in FIGS. 1A and 1B. In addition, by using additive manufacturing techniques, susceptors having both thin shells and/or arbitrary height/length can be achieved via additively manufactured parts as shown by the 0.5 mm thick, 60 mm tall, 57 mm outer diameter susceptor in FIG. 1D, while machined tungsten must be even thicker than 1 mm for larger cylinder lengths. While it may be possible to form a susceptor having thin walls and/or an arbitrary height by rolling sheets of material into a cylinder, doing so will necessarily result in a seam in the walls of the cylinder which may include defects that can affect the transfer of heat by the susceptors; in contrast, the walls of a 3D-printed susceptors in accordance with the present invention are seamless, with no defects to negatively affect heat transfer.

More significantly, use of additive manufacturing enables the fabrication of tungsten susceptors having geometries that are not possible to obtain using conventional machining or molding techniques.

For example, 3D-printed susceptors in accordance with the present invention include cylindrical or other solid-surface susceptors having a patterned wall interior or exterior surface in which grooves, channels, cavities, protrusions or other surface features.

Figure 2:
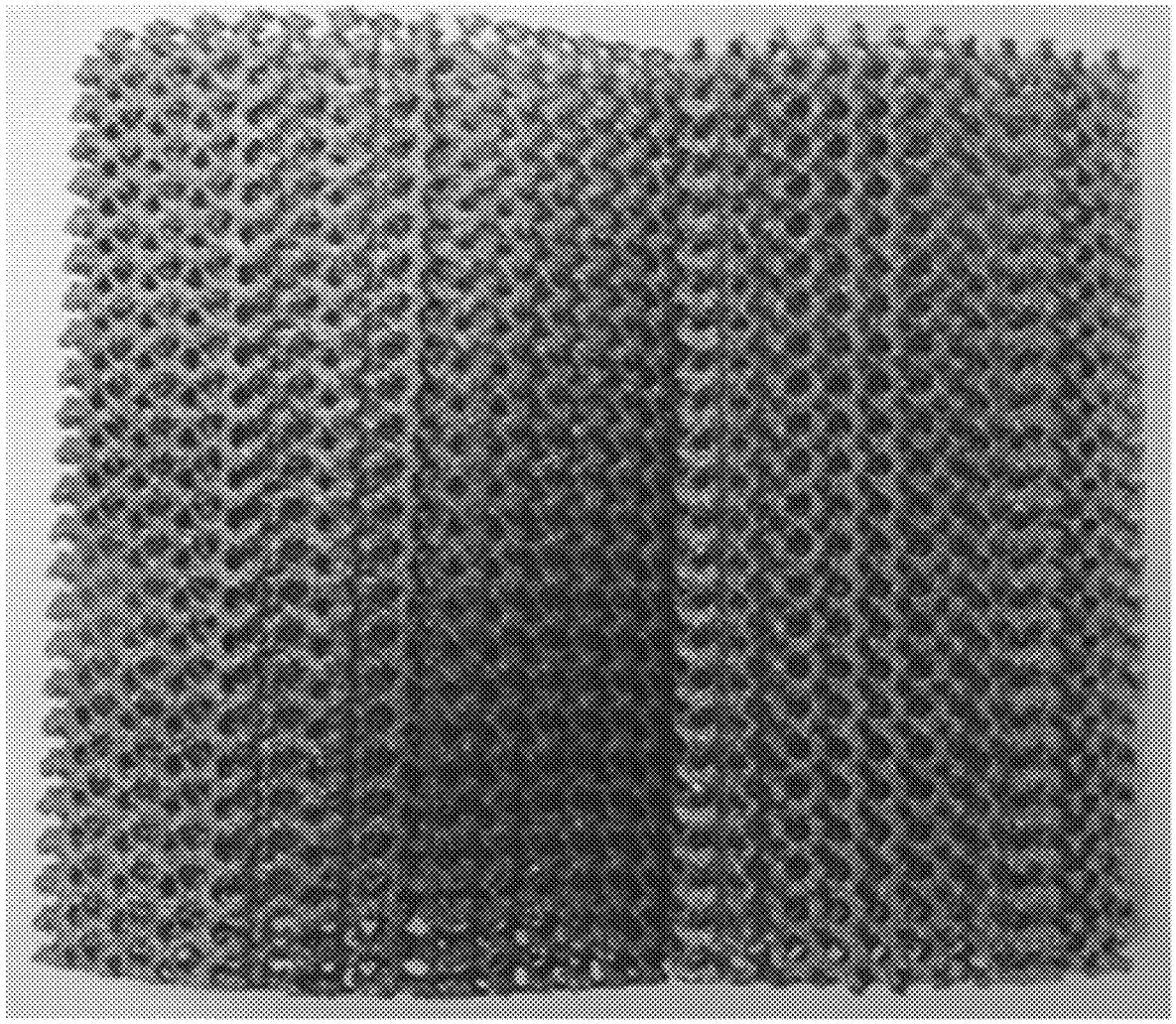
FIG. 2 depicts an exemplary three-dimensional tungsten mesh fabricated via additive manufacturing that can be used to form an RF susceptor in accordance with the present invention.

In other cases, a 3D-printed susceptor in accordance with the present invention does not need to have a solid surface. For example, as illustrated in FIG. 2, the surface of a 3D-printed susceptor in accordance with the present invention can be in the form of an openly porous mesh. Such an intentionally porous structure can be designed to maintain RF absorption, increase surface area to volume ratio to increase radiative and convective heat loss, and reduce thermal mass, all while being designed to see as much or nearly as much radiating surface as for a solid susceptor.

In some embodiments, solid-surface or porous-surface 3D-printed susceptors in accordance with the present invention can be made from high purity tungsten powder, without additives for machinability reducing evaporation of the susceptor during use. In other embodiments, they can be made from other suitable materials such as graphite, molybdenum, tantalum, or rhenium or can be made from a mixture of materials, e.g., either as a mixed powder or by sequential printing of different layers comprising different materials, and all such porous-surface susceptors are deemed to be within the scope of the present invention.

In general, the additional freedom of form that additive manufacturing enables also provides the ability to form susceptors having novel structures that may be particularly useful in some applications. Thus, 3D printed susceptors in accordance with the present invention include not only open-mesh cylindrical susceptors such as those shown in FIG. 2, but also open lattice gyroid designs such as those shown in FIGS. 3A-3C and innumerable other designs. These designs can be difficult to impossible to machine due to the presence of pores and gaps in such designs or the presence of surfaces inaccessible to machining tools or interior voids intentionally added for designed RF absorption, but can be readily manufactured from tungsten powders via 3D printing.

Figure 3A:
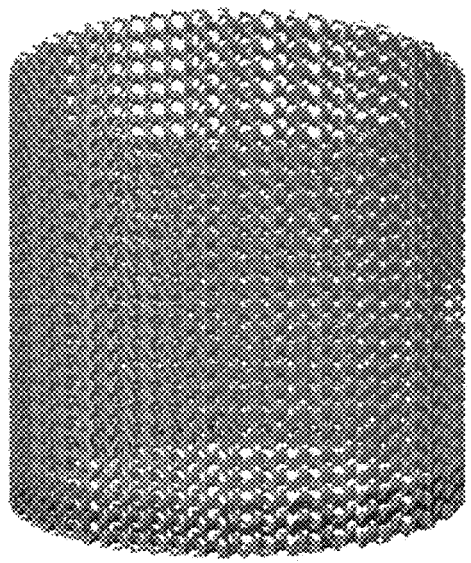
FIGS. 3A-3C depict exemplary RF susceptor designs for a three-dimensional tungsten mesh to be fabricated in a cylinder via additive manufacturing in accordance with the present invention.
Figure 3B:
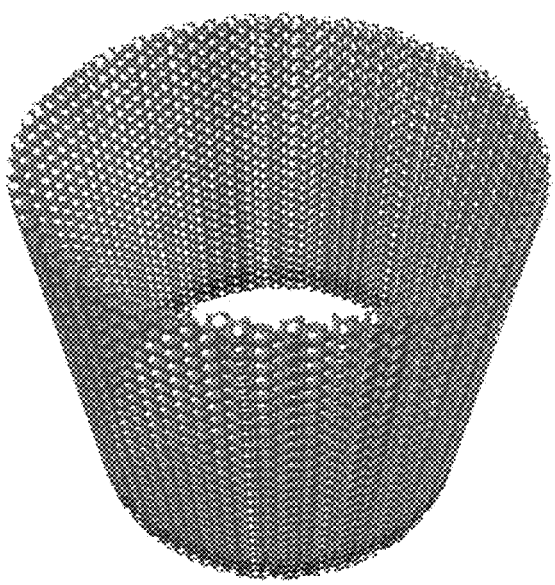
Figure 3C:
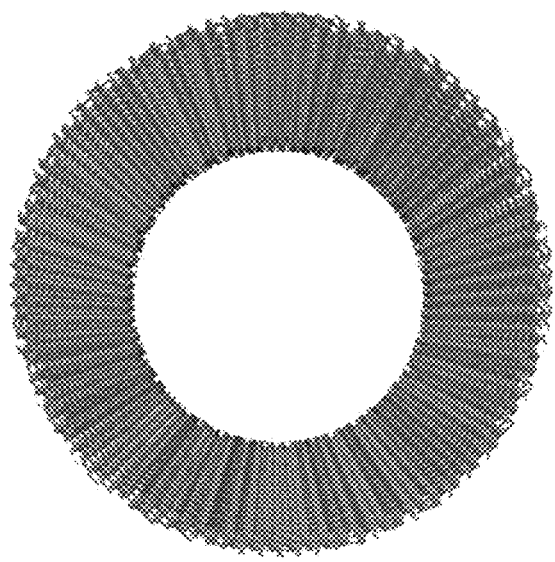

In addition, to the designs shown in FIGS. 2 and 3A/3B, numerous other additively manufactured susceptor geometries may be possible. For example, solid-surface susceptor geometries within the scope of the present invention may include but are not limited to:

Ultra-thin continuous cylindrical susceptors;
Ultra-thin continuous conical susceptors;
Ultra-thin continuous pyramidal susceptors;
Ultra-thin continuous spherical or hemispherical susceptors;
Ultra-thin continuous ellipsoidal susceptors;
Ultra-thin continuous parabolic or paraboloid susceptors;
Ultra-thin continuous toroidal susceptors;
Ultra-thin continuous planar susceptors;
Ultra-thin continuous prismatic susceptors;
Ultra-thin continuous curved 3-dimensional surfaces; and Solid-surface susceptors having a wavy or irregular surface or having holes or gaps can also be formed via additive manufacturing.

In addition, susceptors having open (non-continuous) surfaces such as the mesh structures described above may be formed via additive manufacturing. Additional open-surface susceptors may also be formed, including but not limited to:

Susceptors having small periodic structures (relative to the susceptor size) such as gyroids, double diamond structures, and truss structures;

Uniformly porous pseudo-random small cell structures;

Large scale structures (relative to the susceptor size), such as concentric rings, co-linear or parallel rings, crossing rings at small and large angles, multiple concentric layers of the above rings, rings having non-uniform spacing, helical structures, and double helix structures; and Mesh structures such as square meshes, diamond (distorted square) meshes, triangular meshes, and circular or elliptical meshes.

Other susceptors structures that can be formed via additive manufacturing include flat structures with selectively placed ribs, and susceptors comprising spatially distributed components having solid or hollow connectors between the components; susceptor components, where the connectors can be straight or curved; susceptors with intentional interior voids to selectively modulate RF absorption (reduce or enhance) in a given region.

Susceptors having these and any and all other geometries made possible by additive manufacturing are deemed to be within the scope of the present invention.

FIGS. 4A-4B and 5A-5B further show the improvements in performance that can be obtained from the additively manufactured susceptors in accordance with the present invention.

Figure 4A:
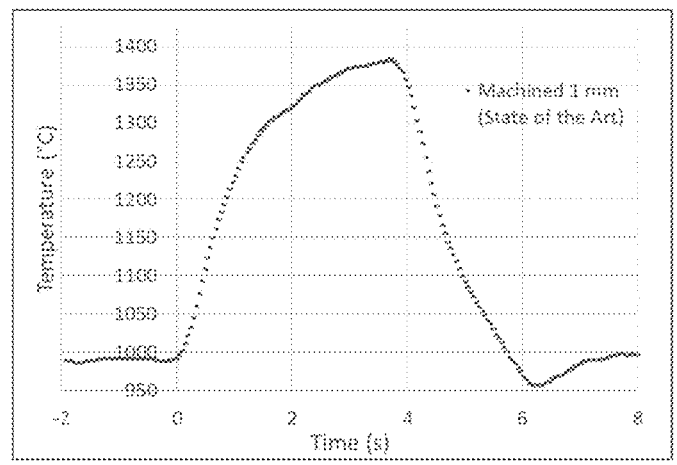
FIGS. 4A-4B illustrate performance drawbacks of a conventional machined tungsten susceptor in accordance with the prior art.
Figure 4B:
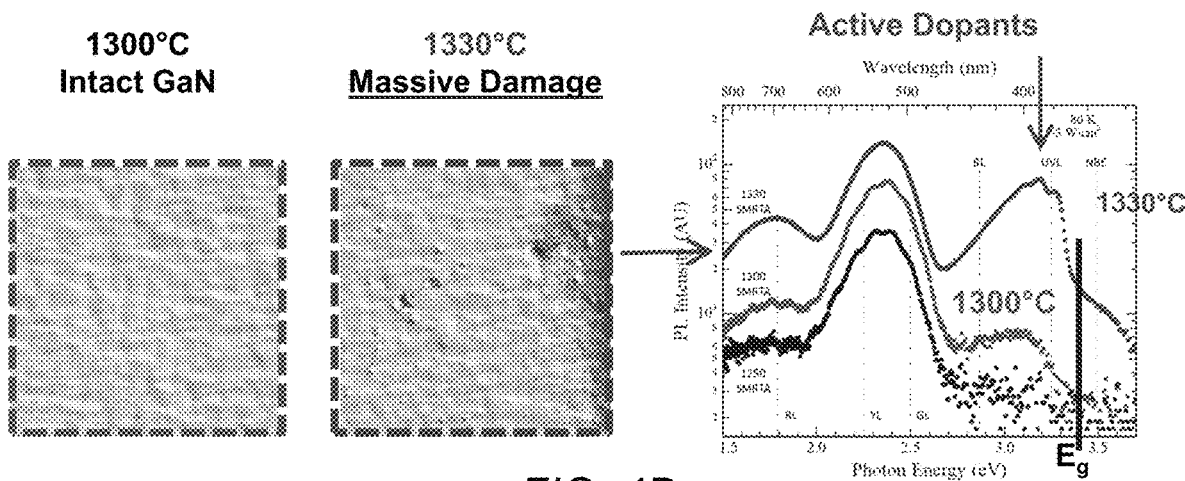

As seen in FIG. 4A, a conventional machined tungsten susceptor initially heats samples quickly but begins to saturate resulting in a scalloped or wave-like heating profile. Upon power removal, the temperature reduces limited by the thermal mass of the susceptor taking 6 seconds for full cycle duration in this example and spending approximately 2.9 s within 25% of the peak temperature. Such heating and cooling times make such a susceptor unsuitable for use in annealing of materials such as GaN, which, as shown in FIG. 4B, decomposes into metallic gallium and nitrogen gas at high temperature and moderate pressures, meaning that the reduced heating and cooling rates near the peak increase the time near the peak temperature and cause damage to the material when it is annealed at peak temperatures at or exceeding 1330° C. This temperature marks the onset of implanted magnesium dopant activation; however, because of the decomposition of GaN at 1330° C., the activation process cannot readily be completed without additional processing.

Figure 5A:
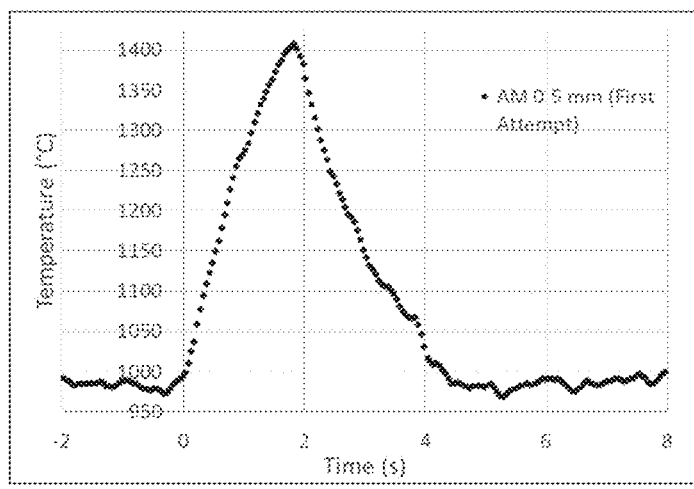
FIGS. 5A-5B illustrate performance improvements provided by an additive-manufactured tungsten susceptor in accordance with the present invention.
Figure 5B:
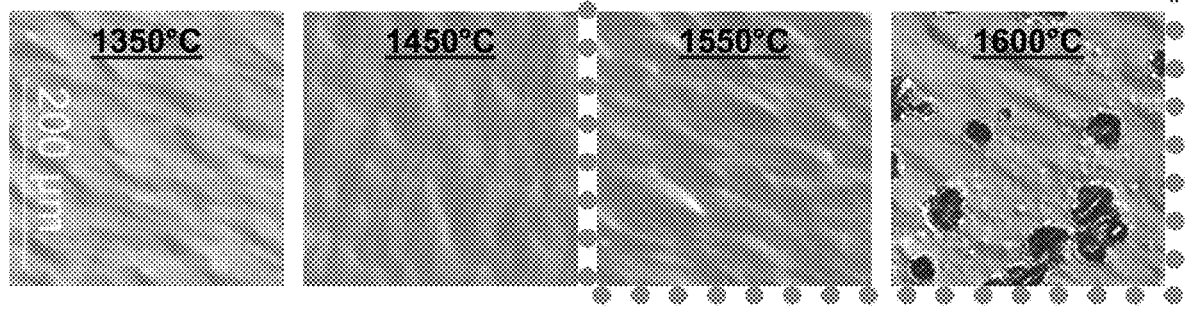

In contrast, as shown by the plot in FIG. 5A, an additively manufactured tungsten susceptor with thinner walls in accordance with the present invention heats and cools more rapidly resulting in a more triangular temperature pulse profile. This profile achieves the same peak temperature as in FIG. 4A but only spends approximately 0.75 s within 25% of the peak pulse temperature. The rapid heating, and more significantly, the rapid cooling near the temperature pulse peak provided by such a susceptor can be of particular use in the annealing of GaN and activation of dopants therein. FIG. 5B shows GaN material that had an onset of damage accumulation for peak temperatures of 1600° C., an improvement of +270° C. from the machined tungsten susceptor. The much higher accessible temperature enables better activation of implanted dopants in GaN.

The additively manufactured tungsten susceptors in accordance with the present invention have additional advantages over the conventionally machined tungsten susceptors of the prior art.

For example, because they are formed from tungsten powder rather than from solid tungsten, the additively manufactured susceptors, in accordance with the present invention, have the ability to precisely control part purity or alloy from mixing powders before they are formed into the susceptors via additive manufacturing. Although susceptors made from pure materials often may be preferred in order to reduce contamination of other metals evaporating from the susceptor and depositing on heated materials during transient heating pulses, alloys with greater tolerance to reactive atmospheres can be readily achieved irrespective to machinability such as tungsten-rhenium alloys or similarly chemically resilient alloys. Additionally, due to the nature of additive manufacturing, little material is wasted and powder can immediately be used on the next part, important for costly materials elements as rhenium.

In addition, additively manufactured parts typically exhibit rough surfaces on similar scale to the metal powder feedstock. While in most applications this is deleterious, roughness slightly enhances surface emissivity enhancing susceptor performance. Furthermore, finishing techniques like electric discharge machining (EDM) can produce smooth surfaces on regions where desired in order to reduce heat flux on the working RF coil or other temperature sensitive regions.

Although particular embodiments, aspects, and features have been described and illustrated, one skilled in the art would readily appreciate that the invention described herein is not limited to only those embodiments, aspects, and features but also contemplates any and all modifications and alternative embodiments that are within the spirit and scope of the underlying invention described and claimed herein. The present application contemplates any and all modifications within the spirit and scope of the underlying invention described and claimed herein, and all such modifications and alternative embodiments are deemed to be within the scope and spirit of the present disclosure.

What is claimed is:

1. A 3D-printed susceptor for rapid indirect radio frequency (RF) heating, comprising:
a free-standing three-dimensional electrically conductive structure for rapid indirect RF heating defined by at least one wall, wherein the at least one wall is constructed of a susceptor material via additive three-dimensional printing, which selectively and additively sinters the susceptor material, such that the at least one wall is a continuous seamless wall of sintered susceptor material defining a hollow interior of the three-dimensional electrically conductive structure, wherein the susceptor material is selected from the group consisting of: tungsten powder, graphite powder, silicon carbide powder, molybdenum powder, rhenium powder, and mixtures thereof, and wherein the three-dimensional electrically conductive structure is in the shape of a pyramid, a sphere, a hemisphere, an ellipsoid, a paraboloid, a toroid, a gyroid, or a prism.

2. The 3D-printed susceptor according to claim 1, wherein the at least one wall comprises a solid surface with holes formed therein.

3. The 3D-printed susceptor according to claim 1, wherein the susceptor consists of tungsten.

4. The 3D-printed susceptor according to claim 1, wherein the susceptor comprises a plurality of successively formed layers formed from tungsten, graphite, silicon carbide, molybdenum and/or rhenium powders.

5. The 3D-printed susceptor according to claim 1, wherein at least a portion of the at least one wall maintains an intrinsic rough texture resulting from the additive three-dimensional printing.

6. The 3D-printed susceptor according to claim 1, wherein the at least one wall has a thickness of less than or equal to 1 mm.

7. The 3D-printed susceptor according to claim 6, wherein the at least one wall has a thickness of less than 0.5 mm.

8. The 3D-printed susceptor according to claim 7, wherein the at least one wall has a thickness of 2 mm.

9. The 3D-printed susceptor according to claim 1, wherein the at least one wall is a solid surface constructed with surface features patterned into at least a portion of the solid surface thereof.

10. The 3D-printed susceptor according to claim 9, wherein the surface features are selected from the group consisting of: grooves, channels, waves, cavities, protrusions, and combinations thereof.

11. A method of heating a semiconductor comprising:
supplying radio frequency (RF) power to a susceptor to heat the susceptor:
exposing the semiconductor to the heat for a period of time; and
removing the power supply to the susceptor, thereby allowing the susceptor's temperature to lower;
wherein the susceptor comprises:
a free-standing three-dimensional electrically conductive structure for rapid indirect RF heating defined by at least one wall, wherein the at least one wall is constructed of a susceptor material via additive three-dimensional printing, which selectively and additively sinters the susceptor material, such that the at least one wall is a continuous seamless wall of sintered susceptor material defining a hollow interior of the three-dimensional electrically conductive structure, wherein the susceptor material is selected from the group consisting of: tungsten powder, graphite powder, silicon carbide powder, molybdenum powder, rhenium powder, and mixtures thereof.

12. The method of claim 11, wherein the semiconductor is gallium nitride.

13. The method of claim 11, wherein the at least one wall is a porous wall having a mesh structure.

14. The method of claim 11, wherein the three-dimensional electrically conductive structure is a cylinder open at a top end and a bottom end thereof.

15. The method of claim 11, wherein the three-dimensional electrically conductive structure is in the shape of a pyramid, a sphere, a hemisphere, an ellipsoid, a paraboloid, a toroid, a gyroid, or a prism.

16. The method of claim 11, wherein the susceptor comprises a plurality of successively formed layers formed from tungsten, graphite, silicon carbide, molybdenum, and/or rhenium powders.

17. The method of claim 11, wherein the at least one wall has a thickness of less than or equal to 1 mm.

18. The method of claim 11, wherein the at least one wall has a thickness of less than 0.5 mm.

* * * * *